UNITED STATES PATENT OFFICE.

THOMAS E. COSTELLO, OF BROOKLYN, NEW YORK.

MEDICATED CALCIMINE.

SPECIFICATION forming part of Letters Patent No. 361,051, dated April 12, 1887.

Application filed November 26, 1884. Renewed March 8, 1887. Serial No. 230,169. (No specimens.)

*To all whom it may concern:*

Be it known that I, THOMAS E. COSTELLO, of Brooklyn, in the county of Kings and State of New York, have invented a new and Improved Medicated Calcimine, of which the following is a full, clear, and exact description.

The object of my invention is to provide a new and improved calcimining composition, which, when applied, does not peal off, dries well, gives a perfect finish, can be applied easily, does not rub off, and kills vermin.

The composition consists of Paris white or whiting, one pound; corrosive sublimate, one-eighth of a tea-spoonful; salicylic acid, one table spoonful; solution of Irish moss, sufficient quantity to produce a jelly with the above ingredients.

The solution of the Irish moss constitutes the binder in this composition, and the salicylic acid and corrosive sublimate prevent the calcimine composition from becoming moldy, either before or after it has been applied. The corrosive sublimate kills insects and other vermin.

The composition can be applied by means of a brush in the usual manner; it dries very rapidly, shows no laps or seams, and does not peal or rub off. Before being applied it has and retains the consistency of a jelly, and does not harden or run or become liquid. The corrosive sublimate and the salicylic acid improve the calcimine, but under certain circumstances may be dispensed with; but I prefer to use them on all occasions, as thereby the calcimine is made a perfect disinfectant and insect-destroyer.

Having thus described my invention, I claim as new and desire to secure by Letters Patent—

A calcimining composition consisting of whiting, corrosive sublimate, salicylic acid, and a solution of Irish moss, as herein set forth.

THOMAS E. COSTELLO.

Witnesses:
OSCAR F. GUNZ,
C. SEDGWICK.